(12) United States Patent
Astleford et al.

(10) Patent No.: US 7,556,154 B2
(45) Date of Patent: Jul. 7, 2009

(54) DRILL FLUID SCREENING DEVICE

(76) Inventors: John Astleford, Ye Olde Manor House, 8 Newark Road, Bassingham, Lincoln (GB) LN5 9HA; Sharon Astleford, Ye Olde Manor House, 8 Newark Road, Bassingham, Lincoln (GB) LN5 9HA ( * ) Notice: Subject to any disclaimer, the term of this patent is extended or adjusted under 35 U.S.C. 154(b) by 324 days.

(21) Appl. No.: 11/250,033

(22) Filed: Oct. 13, 2005

(65) Prior Publication Data

US 2006/0081508 A1 Apr. 20, 2006

(30) Foreign Application Priority Data

Oct. 16, 2004 (GB) .................................. 0423021.5

(51) Int. Cl.
*B07B 1/46* (2006.01)
(52) U.S. Cl. ...................... 209/257; 209/243; 209/247; 210/800; 210/803
(58) Field of Classification Search ................ 209/257, 209/920, 309, 158, 159, 17, 243, 247, 250, 209/268, 423, 425, 486, 497, 500; 210/298, 210/297, 780, 800, 803, 384, 385, 388, 523, 210/526
See application file for complete search history.

(56) References Cited

U.S. PATENT DOCUMENTS

| | | | |
|---|---|---|---|
| 2,738,068 A * | 3/1956 | Marston | 209/158 |
| 4,459,207 A | 7/1984 | Young | |
| 6,220,445 B1 * | 4/2001 | Williams | 209/272 |
| 6,889,846 B2 * | 5/2005 | Olsen et al. | 209/404 |
| 2003/0075489 A1 * | 4/2003 | Lakshman | 210/143 |
| 2004/0206673 A1 * | 10/2004 | Peresan | 209/268 |
| 2006/0243643 A1 * | 11/2006 | Scott et al. | 209/309 |
| 2007/0108106 A1 * | 5/2007 | Burnett | 209/325 |

FOREIGN PATENT DOCUMENTS

| | | |
|---|---|---|
| FR | 1 264 698 A | 6/1961 |
| WO | WO 02/43832 A1 | 6/2002 |
| WO | WO 03/028907 A1 | 4/2003 |

* cited by examiner

*Primary Examiner*—Patrick H Mackey
*Assistant Examiner*—Kalyanavenkateshware Kumar
(74) *Attorney, Agent, or Firm*—Jason A. Bernstein; Powell Goldstein LLP

(57) ABSTRACT

In a method and apparatus for screening drilling fluids to remove entrained debris, the fluid is urged upwardly from the lower side to the upper side of an inclined or horizontal mesh screen, so that debris falls from the face of the screen under gravity to be collected and removed, and the clean fluid emerges above the screen. The debris may be removed by a conveyor or by a vibrating mesh surface. The operating life of the screen is thereby extended.

18 Claims, 3 Drawing Sheets

DRILL FLUID SCREENING DEVICE

PRIORITY CLAIM

This application claims the priority to United Kingdom Patent Application 0423021.5, filed Oct. 16, 2004, the specification of which is incorporated herein by reference in its entirety herein.

FIELD OF THE INVENTION

This invention relates to the screening of drilling fluids to remove debris during the drilling of boreholes particularly, but not exclusively, for drilling operations for hydrocarbons such as oil and gas.

BACKGROUND TO THE INVENTION

During the drilling of a bore hole a flushing fluid is circulated around the borehole to remove the debris generated by the drill bit. This debris is entrained in the flushing fluid and attempts are made to remove all debris from the flushing fluid at the surface so that the flushing fluid can be re-used. The industry term for this flushing fluid is drilling fluid or mud.

Great efforts are made to increase the efficiency of the debris removal prior to re-use, as the drilling performance decreases with increasing debris content. In the worst case excessive debris levels make the mud unusable and it has to be discarded. The performance of a debris-laden mud can be improved by either replacing a portion of the mud, or by performing secondary chemical and or mechanical treatments. The requirement for secondary treatments and/or mud replacement significantly increases operating costs and often has environmental implications.

It is common practice initially to try to remove the majority of the debris by flowing the debris laden mud over and through a device containing a vibrating screen, typically referred to as a shale shaker or shaker. The shale shaker allows the mud to filter through a screen which vibrates in such a manner as to convey the debris along and off the top of the screen (or screens) to its disposal point. The cleaned mud is then either pumped down the borehole to flush out further debris or is sent for secondary processing prior to re-use. The smaller the aperture of the holes in the vibrating screen of the shale shaker the better the screen is at removing fine particles that are the most detrimental to drilling fluid performance.

The shale shaker is the primary method of removing the debris from the mud. Generally it is a robust piece of equipment. However there are several disadvantages to this method:

The screens often plug up with debris getting trapped in the screen mesh resulting in the loss of excess mud with the waste debris. This loss of mud increases costs and may be environmentally unacceptable. To avoid this, coarser screens (screens with larger apertures) are often fitted. This allows more debris to remain in the mud, which in turn increases the amount of additional treatments required to return the mud to its desired properties. In the worst case the majority of the screen area may become covered or plugged with debris, resulting in most of the mud being discarded with the debris. This is often referred to as screen blinding.

The screens do not have a long life, especially when the finer mesh screens (screens with smaller apertures) are used. Therefore it is expensive to run fine screens that remove most of the debris. In fact very often the screens with the smallest apertures are not run because screen replacement costs exceed the additional treatment costs associated with treating the mud to make it fit for purpose. In the worst instances, screen life may be as low as a few hours. Screen wear is compounded by the fact that the debris continually impounds on the length of the screen. Screen wear is highest at the point where the fluid first hits the screen. Screens may therefore be discarded when a large portion of the screen has relatively little wear.

The throughput of the screens, often referred to as the conductance, usually decreases when finer mesh screens are used, as the percentage of wire to open hole area increases. Thus for a given screen area, when higher throughputs are required, it is often necessary to fit larger screens which allow more debris to remain in the mud.

The throughput or conductance through the screens decreases as the amount of debris in the mud increases, as may be the case when drilling rates increase. This is due to the covering of the screen apertures with debris. To avoid the loss of mud it may be necessary to fit larger screens, which again allows additional amounts of debris to remain in the mud.

Screens are expensive and take time to replace. While screens are being replaced, it may become necessary to reduce the circulation rate of the mud, reducing the performance of the drilling operation. Even the few minutes taken to make the change can add significant costs to an expensive drilling operation.

Screen area is limited as the depth of the pool of fluid on top of the screens is limited by the difficulty in transporting debris uphill to be discarded by means of vibration alone.

FIG. 1 illustrates an apparatus according to the prior art, in which the debris laden mud 1 flows downwardly through a vibrating flat screen 2 to filter out the debris. The screen 2 is vibrated by vibrating the whole body of the apparatus using motors 3 with eccentric weights, for example. The cleaned mud exits the apparatus and then generally is ready for re-use. Debris that does not pass through the screen is caught on the screen and is carried by the direction and amplitude of the screen vibration upwardly towards an exit 4. Corrugated shaped screens are often referred to in the industry as pyramid screens. In prior art screens the mud passes either vertically down through the screen, as is the case with the flat screens, or has a downward component to the flow, as is the case with the pyramid screens. More recently arrangements have been proposed where the angle of the screen is increased and may be vertical in parts.

Examples of this general configuration of filter are disclosed in U.S. Pat. No. 4,459,207, WO-A-02 43 832 and WO-A-03 028 907.

The object of the present invention is to provide apparatus for sieving the mud which reduces the disadvantages of prior art equipment.

SUMMARY OF THE INVENTION

The method of the invention is characterised by passing the fluid through the screen from the side of the screen having the generally downwardly directed face through to the side having the generally upwardly directed face.

Apparatus in accordance with the invention has means for urging the fluid through said screen, and is characterised in that the means for urging the fluid is connected to the face of the screen which is directed generally downwardly, whereby the fluid passes through the screen from said face to the face which is directed generally upwardly.

Drilling fluid or mud must be introduced below the screens and must be forced up through the screen such that the mud has an upward component to the flow. Hydrostatic pressure or applied pressure is used to achieve the vertical component of the flow; this pressure must be sufficient to force the mud through the screen at an acceptable rate. Ideally this pressure should be high enough to provide sufficient throughput, but low enough to prevent debris being forced onto the screen surface making its removal more difficult. Ideally the hydrostatic pressure required is envisaged to be between 0 and 15 kPa depending on the height of the screen. The invention may also be used to remove part of the fluid prior to processing the debris over conventional shale shakers.

The means of conveying and drying debris may be the same as prior art cleaning mechanisms, i.e. the amplitude and direction of vibration of the screen will convey debris out of the shaker. However, in this invention the surface at the base of the pool that conveys the debris does not have to be a screen that maximises conductance as in prior art but could be a screen that maximises screen longevity. Alternatively this could be a roughened plate, which has two advantages; wear and tear is reduced and the speed debris is removed out of the shaker is improved as debris is less likely to get stuck in the screen apertures. Alternatively with this inventsion, various other means of removing debris such as revolving belts or chains could also be used to convey debris out of the submerged portion of the apparatus.

In one embodiment of the invention, the separated debris is allowed to settle out in a tank having an auger or other solids conveying means in the bottom thereof to remove the solids. The conveying means is only operated when the liquid content of the settled solids is below a pre-determined level, so as to minimise the need for further separation stages. Sensors may be provided in the tank to determine the water content above the auger or other conveying means.

Where a roughened plate is used, the plate must be roughened in such a manner so as to maximise the speed of transport of the debris off the shale shaker. Typically the indents and protrusions on the roughened plate should be less than the amplitude of vibration of the shale shaker in height, and protrusions should not be more than the ampltitude of vibration apart. Typically the amplitude of vibration is in the region of 0.2-10 millimetres. It may be necessary to coat the plate with a non-stick material if sticky debris is encountered in the drilling operation.

A further advantage of the invention is that, whereas prior art techniques often had to rely on flowing the mud through successively finer screens on one or more shakers to achieve the desired effect, this invention allows for multiple pools of mud with the final desired screen mesh to be fitted to one shaker.

Where it is important to reduce the amount of mud associated with debris, a conventional shaker, screw press, or centrifugal device could be used to recover additional mud associated with the debris.

A further advantage of the invention is that smaller aperture screens may be used for a given throughput. Plugging or blinding of screens is not as likely as with prior art equipment as gravity will assist the removal of debris off the screen, this will enable smaller particles of debris to be removed and thus enhance the longevity and performance of the mud.

Another advantage of the invention is that the wear and tear on the screens will be substantially reduced, as the debris will not impede on any upper surfaces of the screen. This will lead to greater longevity of the screens and thus reduce screen costs.

Another advantage of the invention is that the screen can be manufactured in such a manner as to maximise the surface area of the screen without concerns for the effect of the shape of the screen on the conveyance of debris off the shaker.

Another advantage of the invention is that capacity may readily be increases by adding further pool and screen assemblies to one shaker to operate in parallel, thus increasing surface screening area and reducing the total equipment requirement. By contrast in prior art shakers, the screens are cascaded, with successively finer screens being used to achieve the desired level of separation, and throughput is limited, while capital costs are high.

A final advantage of the invention is that with prior art the wires used to make the screen had to be very fine and very strong to improve throughput and increase longevity. In this invention because the surface area of the screen can be increased significantly over prior art screens, thicker (and hence longer lasting) strands can be used to make the screens, additionally because the screens are not subjected to the wear and tear of traditional shale shakers various other screening materials such as plastics or softer metals may be considered.

DETAILED DESCRIPTION OF THE ILLUSTRATED EMBODIMENTS

Figure 1:
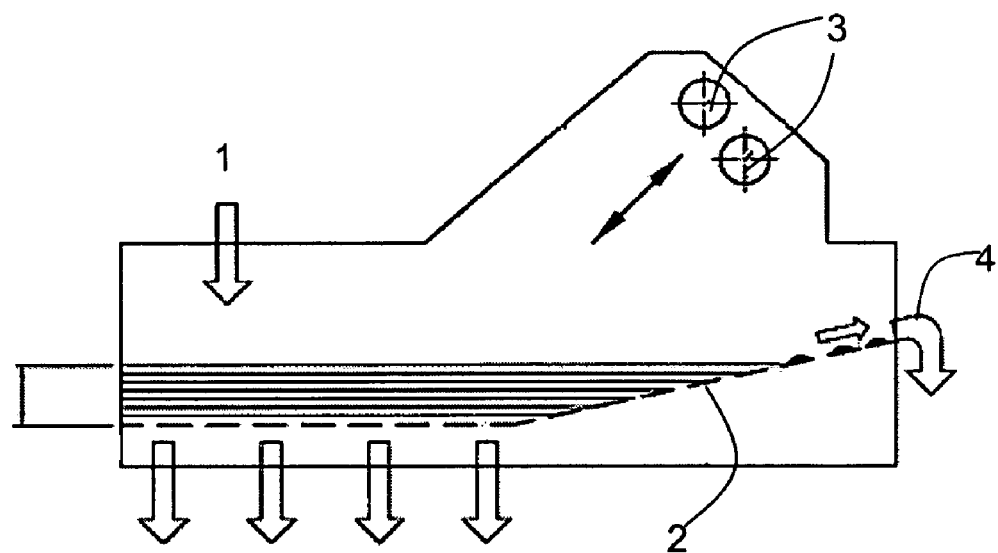
FIG. 1 is a diagram illustrating a prior art screening apparatus.
Figure 2:
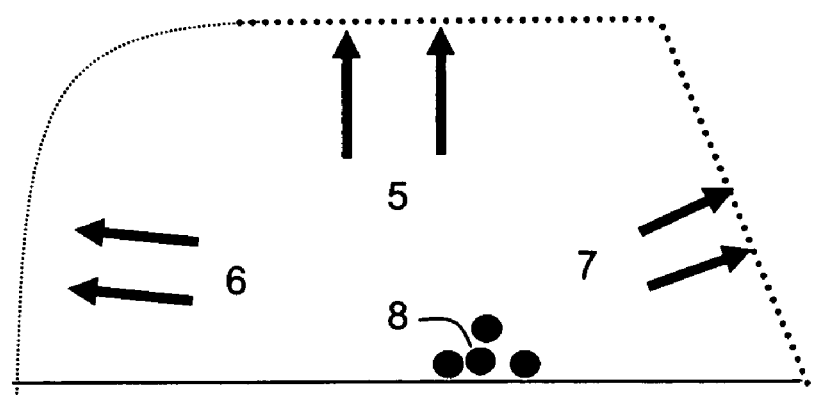
FIG. 2 is a diagram illustrating various mud flow paths in apparatus according to the invention.

Conceptually, FIG. 2 shows the new directions of flow for drilling fluid or mud with entrained debris. The mud passes through the screen either vertically 5, horizontally 6, or with an upward component 7. The debris falls under gravity to the lower surface 8 where it is conveyed out of the apparatus. The lower surface 8 may be a mesh screen, a roughened plate or a rotating belt or chain(s). The design of the apparatus must be such that it is not possible for debris laden mud to bypass the screens. Unlike in the prior art configurations, the mud is introduced into a compartment under the screens, not from above the screens. The pressure required to force the mud through the screen is provided by the height of a pool of mud adjacent to the screening compartment, although alternatively this could be provided for by other means such as a centrifugal pump.

Figure 3:
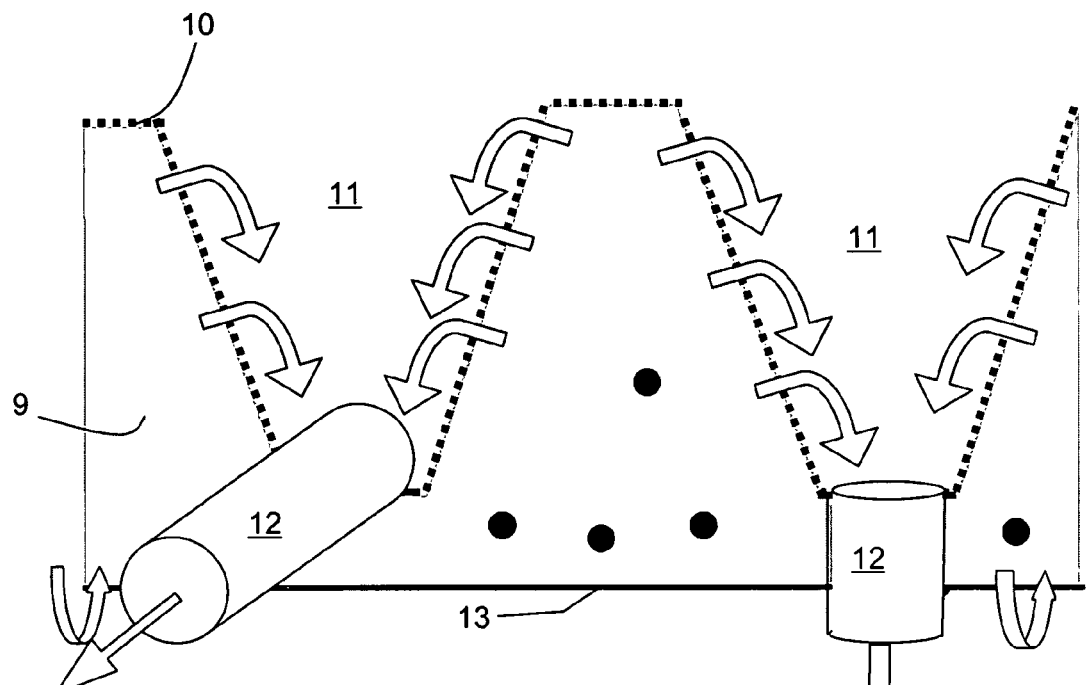
FIG. 3 is a diagrammatic end view of an apparatus according to one exemplary embodiment of the invention.
Figure 4:
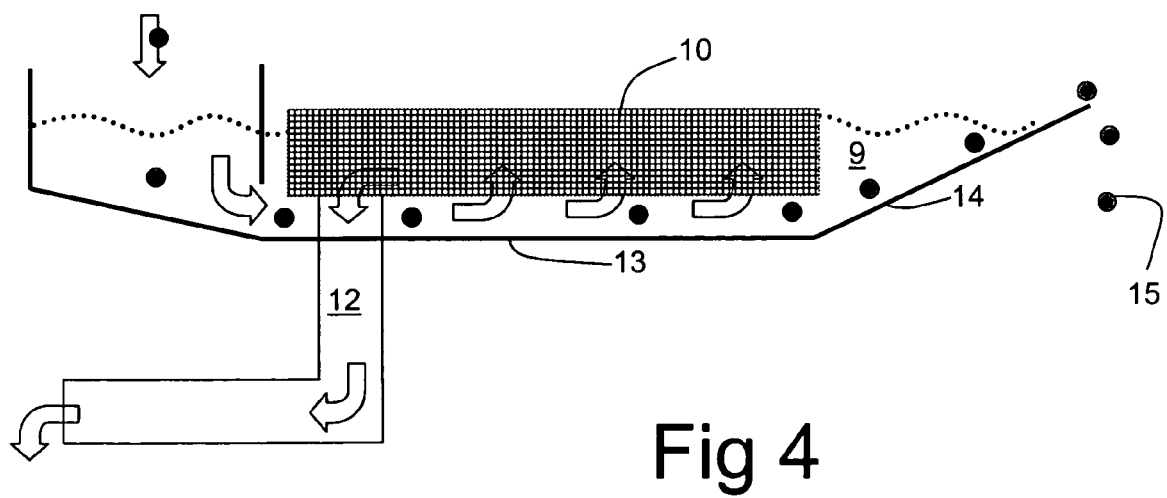
FIG. 4 is a side view of the apparatus of FIG. 3.

Referring now to FIGS. 3 and 4, debris-laden fluid or mud is introduced into a pool 9, and the fluid is forced through a vibrating screen 10 into a channel 11 that allows the substantially debris free mud to flow via pipe work or channels 12 to tanks for subsequent re-use. The cleaned mud may either exit the shakers from the sides or bottom of the shaker. The debris falls under gravity to a lower surface 13, which conveys the debris out from under the screen by vibration or via a moving belt. An inclined surface 14 conveys the debris out of the pool. This mode of conveyance may alternatively be a moving belt; however it is preferably similar to prior art inclined surfaces and consists of a vibrating screen which will assist the removal of mud from the debris. The debris 15 exiting the device may be sent to a screw press, centrifugal device or prior art shaker to further recover mud closely associated with the debris.

Figure 5:
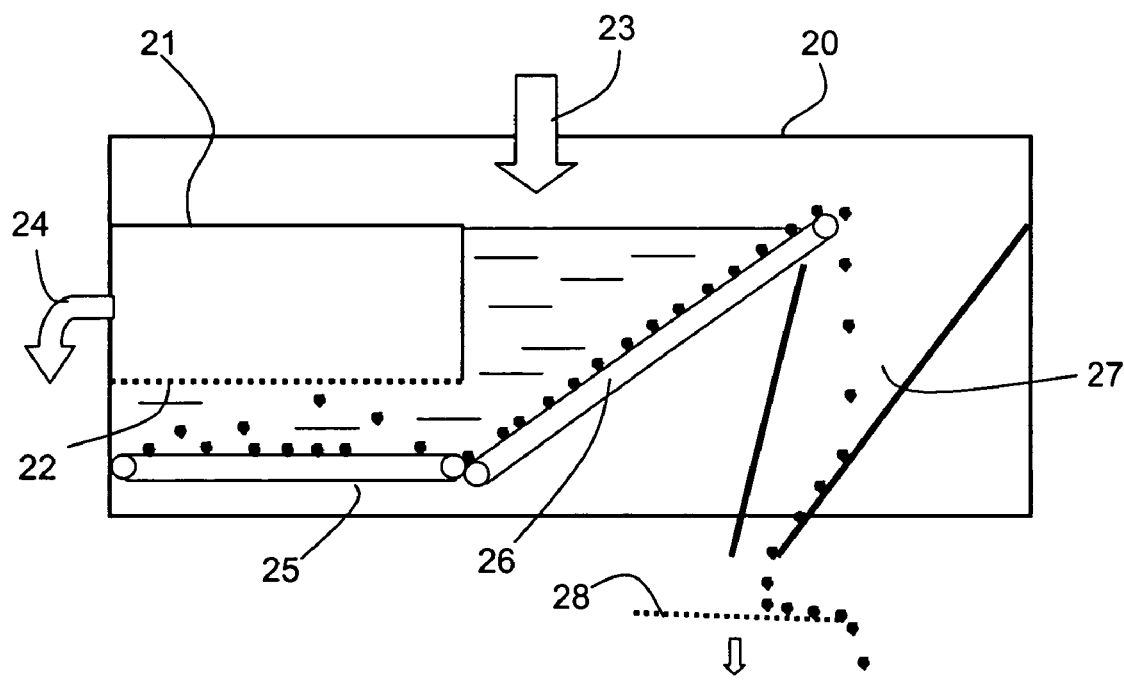
FIG. 5 illustrates an alternative embodiment of the invention.

FIG. 5 shows an alternative arrangement, in which a main enclosure 20 contains a filter body 21 whose lowermost wall consists of a screen 22 which can be vibrated with the body 21 or independently thereof. In either case, the energy required to vibrate the screen is substantially smaller than would be required for vibration of the whole apparatus, as in the prior art apparatus. Debris-laden mud enters at 23 and the head of mud above the level of the screen 22 is sufficient to drive the mud through the screen into the body 21, from where it can flow out at 24 for re-use. Debris retained by the screen 22 is dislodged by the vibration and falls on to a horizontal conveyor belt 25, which carries it on to an inclined conveyor belt 26. This belt 26 carries the debris out of the mud and discharges it into a chute 27, from which it falls on to a secondary vibrating screen 28 arranged to remove residual mud for re-use before discharging the debris for disposal.

Figure 6:
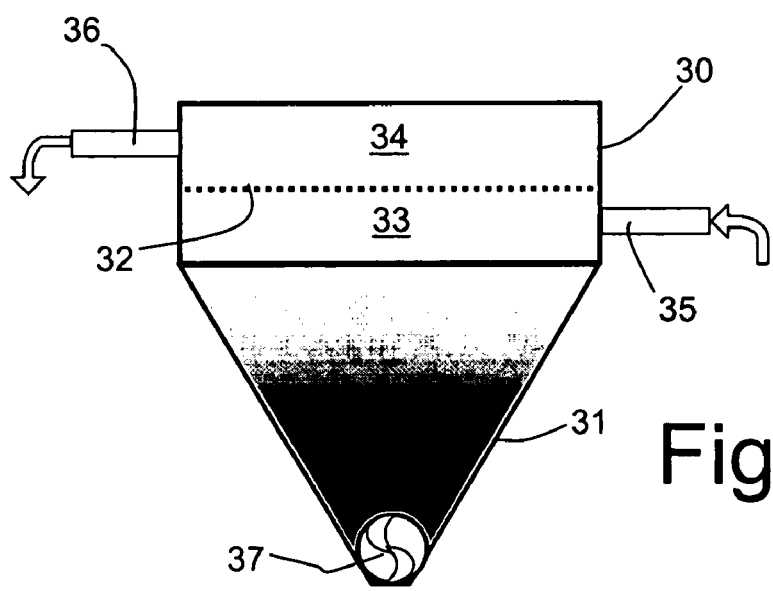
FIG. 6 illustrates yet another embodiment of the invention.

The embodiment of FIG. 6 has a filtration section 30 of uniform cross-section and a tapering section 31 beneath it. The filtration section 30 contains a vibrating screen 32 mounted so as to separate the filtration section into two sections: a lower inlet section 33 and an upper outlet section 34. The inlet section 33 is supplied with debris-laden mud via a supply pipe 35. The mud is pumped or otherwise supplied at a pressure sufficient to urge it upwardly through the vibrating screen 32 and into the outlet section 34, from where it flows for re-use through an outlet pipe 36.

Debris retained by the screen 32 falls into the tapering section 31, where it settles. An auger 37 is mounted in the lowermost part of the tapering section 31 and can be driven by an external motor (not shown) to urge the settled material out of the apparatus for disposal or further filtration or treatment as required to extract any residual liquid mud. In order to ensure that the minimum of liquid is removed in this manner, the tapering section 31 can be provided with a sensor to detect density or liquid content of the settled material above the auger 37 and to prevent operation of the external motor when the liquid content of the material adjacent to the auger is above a predetermined proportion, thereby preventing the loss of excess liquid mud.

It will be understood that, while the debris is represented in the drawings as discrete lumps or rock pieces, it will typically be a mixture of larger and smaller particles and pieces.

While exemplary embodiments of the invention are illustrated in and described with reference to the drawings, the apparatus of the invention can be configured in a wide range of ways within the scope of the invention as defined by the claims.

The invention claimed is:

1. A method for removing debris from drilling fluid, comprising:
   a. passing the fluid through a vibrating screen which lies in a non-vertical plane the screen having a top face and a bottom face, the bottom face being directed downwardly and the top face is directed upwardly, wherein the fluid initially contacts the bottom face of the screen and passes through the screen to the top face against gravity, whereby fluid passes through the screen and debris not passing through the screen settles generally lower than the bottom face of the screen, and
   b. transporting said debris settling beneath the screen upwardly out of the fluid for disposal.

2. A method according to claim 1, further comprising locating conveyor means beneath the screen to transport the debris away from the screen.

3. A method according to claim 2, wherein the conveyor means comprises a vibrating roughened plate.

4. A method according to claim 3, wherein the roughened plate comprises protrusions which extend from the plate by a distance which is less than half the amplitude of vibration of the plate.

5. A method according to claim 4, wherein the protrusions are spaced apart one from another by a distance which is less than half the amplitude of vibration of the plate.

6. A method according to claim 3, wherein the roughened plate is provided with a non-stick coating.

7. A method according to claim 2, wherein the conveyor means comprises an endless belt.

8. A method according to claim 2, wherein the conveyor means comprises moving chains.

9. An apparatus for removing debris from drilling fluid, comprising:
   a. a vibrating screen which lies in a non-vertical plane, the screen having a bottom face directed downwardly and a top face directed upwardly, whereby the vibration dislodges debris from the bottom face of the screen, the debris not passing through the screen settling generally lower than the bottom face of the screen;
   b. a fluid inlet positioned in proximity to the screen such that fluid initially contacting the bottom face of the screen and passes through the screen to the top face against gravity; and,
   c. conveyor means provided generally beneath or lower than the screen for transporting debris settling lower than the screen upwardly out of the fluid for disposal.

10. The apparatus according to claim 9, wherein the conveyor means comprises a vibrating roughened plate.

11. Apparatus according to claim 10, wherein the roughened plate comprises protrusions which extend from the plate by a distance which is less than half the amplitude of vibration of the plate.

12. The apparatus according to claim 11, wherein the protrusions are spaced apart one from another by a distance which is less than half the amplitude of vibration of the plate.

13. Apparatus according to claim 10, wherein the roughened plate is provided with a non-stick coating.

14. Apparatus according to claim 9, wherein the conveyor means comprises an endless belt.

15. Apparatus according to claim 9, wherein the conveyor means comprises a chain conveyor.

16. Apparatus according to claim 9, wherein the vibrating screen lies in a horizontal plane.

17. A method according to claim 3, comprising vibrating the plate with an amplitude of 0.2 to 10 mm.

18. Apparatus according to claim 10, wherein the means for vibrating the roughened plate is arranged to vibrate the plate with an amplitude of 0.2 to 10 mm.

* * * * *